United States Patent  [11] 3,615,677

| [72] | Inventors | Rudolph Karl Scharschmidt<br>Battle Creek, Mich.;<br>Lee F. Aubel, Santa Ana, Calif.; Morton Kaplan, Battle Creek, Mich. |
|---|---|---|
| [21] | Appl. No. | 9,433 |
| [22] | Filed | Feb. 6, 1970 |
| [45] | Patented | Oct. 26, 1971 |
| [73] | Assignee | General Foods Corporation<br>White Plains, N.Y. |

[54] HIGH PROTEIN ALIMENTARY PASTE PRODUCTS
15 Claims, No Drawings

| [52] | U.S. Cl. | 99/85 |
|---|---|---|
| [51] | Int. Cl. | A23l 1/16 |
| [50] | Field of Search | 99/85 |

[56] References Cited
UNITED STATES PATENTS

| 2,450,525 | 10/1948 | Samson | 99/85 |
| 2,704,723 | 3/1955 | Poole | 99/85 |
| 3,082,092 | 3/1963 | De Felice | 99/85 |
| 3,192,049 | 6/1965 | Kinsley | 99/85 |

*Primary Examiner*—Raymond N. Jones
*Assistant Examiner*—James R. Hoffman
*Attorneys*—Bruno P. Struzzi, Thomas V. Sullivan and Daniel J. Donovan ABSTRACT: Alimentary paste products, high in protein but low in cost, are prepared from corn flour, soy flour of NSI of greater than 50 and wheat flour by shaping a dough made from the blended flours and drying the shaped dough. Either conventional paste drying of the shaped dough can be employed or the shaped dough pieces can be rapidly dried at elevated temperatures, provided the starch in the dough is at least partially gelatinized at some point during the process.

HIGH PROTEIN ALIMENTARY PASTE PRODUCTS

BACKGROUND OF THE INVENTION

The present invention relates to improvements in the production of alimentary paste products such as spaghetti, macaroni, noodles and the like. More particularly, it relates to the preparation of highly nutritious, rapid cooking alimentary paste products.

Conventional alimentary paste products such as spaghetti, vermicelli and other products known as long goods must be made of a material sufficiently strong to withstand breakage when dried. Accordingly, they are generally made from hard wheat flour which, because of its high gluten content, forms strong continuous strands which maintain their strength even when dried. Unfortunately, the gluten in the paste products has a tendency to form a somewhat water impermeable skin on the surface of the paste products; consequently, they must be dried very slowly such as over a period of 12 to 48 hours at carefully controlled temperatures and relative humidities. If the drying rate is not carefully controlled, the outside surface of the paste product will dry too quickly and case harden such that moisture migrating from the inner portions of the paste product will not be able to escape rapidly enough with the result that breaks in the surface of the paste product will form, a phenomenon known as checking.

Conventional paste products require a cooking time of about 12-15 minutes in order to fully hydrate and gelatinize the starch therein due to the somewhat water impermeable outer skin of the products. In an attempt to decrease the cooking time of alimentary paste products one worker (Poole, U.S. Pat. No. 2,704,723) modified the standard paste manufacturing process by precooking the paste product prior to drying. These products, however, still require a substantial cooking time such as between about 8 and 15 minutes. Further, when cooked they tend to have a slimy surface. An important development in the preparation of quick cooking alimentary paste products was made by Kinsley (U.S. Pat. No. 3,192,049) who discovered a method of preparing alimentary paste products which required less cooking time, consisting of extruding a dough comprised of a hard wheat flour and a small amount of a proteinaceous material such as soy flour, vital wheat gluten, etc., gelatinizing the extruded dough as by water or steam cooking and drying the gelatinized dough. Products prepared according to the Kinsley invention, in addition to having a tendency to form a slimy surface upon being cooked, also possess an undesirable flavor because of the presence of vital gluten or harsh flavored soy materials.

Methods for preparing nutritious paste products which can be dried quickly and are rapid cooking have now been discovered. Accordingly, it is a principal object of the invention to present high protein, quick cooking alimentary paste products. It is another object of the invention to present an improved process for preparing rapid cooking high protein alimentary paste products. These and other objects will become apparent as the description proceeds.

SUMMARY OF THE INVENTION

The quick cooking paste composition of the present invention is comprised of about 45-85 percent corn flour, 15-40 percent soy flour and 0-30 percent wheat flour. The product is prepared by dry blending the corn, soy and wheat flours, mixing the blend with water and kneading the mixture to form a dough, extruding the dough into the desired form and drying the shaped paste product to a final moisture content of less than about 12 percent with air. Either conventional paste drying at controlled temperature and humidity for 12 to 48 hours can be employed with cook time regulated by control of the product wall thickness or high temperature drying at about 150°-300° F. for about 5 -120 minutes can be employed, while at the same time at least partially gelatinizing the starch in the paste product. Alternatively, for high temperature drying the gelatinization of the starch in the product can be effected prior to, during, or after extrusion, such as by steam or water cooking, or by the use of a heated jacketed extruder or the corn flour used in the product formulation can be partially gelatinized.

DESCRIPTION OF THE INVENTION

Corn flour, conventional or pregelatinized, is used in the alimentary paste formulation of the invention because of its ability to perform certain important functions. The primary function of the corn flour is to serve as a binder for the finished product. Since a major amount of the hard wheat flour normally present in alimentary paste products is replaced by corn and soy flours which do not contain vital gluten, the proteinaceous materials from which wheat flour dough derives its cohesiveness, it is necessary to find a suitable means of imparting cohesiveness and dry strength to the novel products of the invention. This is accomplished by careful control of the proportions of corn, soy and wheat employed in the formulation, and/or the processing conditions. Further cohesiveness is obtained by partial gelatinization of the starch present in the corn and wheat flours during one or more of the process steps of the invention, or partially pregelatinized corn flour may be used in the formulation. A second major function of the corn is to mask the harsh, bitter flavor of soy materials, thus making it possible to use a relatively high percentage of soy flour in the disclosed products. Wheat flour, because of its very bland character, is unable by itself to satisfactorily offset the flavor of soy flour when the latter is used as a substantial constituent of a wheat flour-based food composition.

In addition to the above major functions, corn flour has several other desirable attributes which enhance the disclosed alimentary paste products. For example, it makes possible the preparation of low cost paste products since corn flour is much less expensive than hard wheat flour. Additionally, it improves the nutritional value of alimentary paste products by providing a better balance of amino acids. Thirdly, it offsets the dull gray color of the soy-wheat flour combination and imparts a desirable golden appearance to the finished paste products. Lastly, since it may be partially gelatinized, paste products made according to the invention are easily and rapidly prepared for eating.

Ordinary corn flour can be used in the present invention, the only requirement being it must be dehulled and degerminated. The germ is removed because it contains a high percentage of oil which will become rancid after a few days, and which also makes it extremely difficult to finely mill the flour. The term "corn flour" as used in the present invention denotes a product which has been milled to pass through a 20 mesh screen (U.S. Standard) and comprehends not only conventional corn flour, but also corn meal.

Soy flour is used in the present invention as a source of inexpensive highly nutritious protein. In addition to its value as a source of protein, it also serves as a diluent for the wheat gluten in the paste product, rendering discontinuous the skin formed on the outside of the product by the wheat gluten; in other words, it reduces the water impermeability of the finished product, thereby enabling it to be dried more readily, as well as to imbibe water and rehydrate at a much faster rate. Thus, partly because the starch in the product may be at least partially gelatinized and partly because of the increased hydration rate of the product of the invention, its cooking time is considerably reduced. The soy flour provides an additional function in the process disclosed. Because of its high water absorbing properties, it provides a matrix to hold the shaped paste pieces together until the starch present is partially gelatinized, whereupon the partially gelatinized starch becomes the primary binding agent.

It is preferable to use defatted soy flour, although full fat soy flour can be used since it is available as a stable, finely milled flour. It is preferable that the soy flour be toasted, as toasting improves its flavor and renders it more digestible by inactivating antitrypsin enzymes usually present in soy flour. However, where improvement in product firmness is desired, it is preferred to use an untoasted soy flour having a high soluble protein index. The term "soy flour" as used in the present discussion includes defatted and full fat soy flour, soy protein concentrate and isolated soy protein; preferably milled to a particle size which will pass through an 80 mesh screen (U.S. Standard).

Although it is not strictly necessary to add wheat flour to the dough composition, it can be added if desired. Its use in the product provides several benefits. Firstly, it imparts strength to the paste products both prior to drying and after cooking because of the wheat gluten present in wheat flour. Secondly, it improves the nutritional value of the alimentary paste products of this invention by providing a better balance of amino acids. However, because of its skin-forming nature, it is used as a minor ingredient in the disclosed products. The preferred wheat flour is hard wheat, a type which contains about 12-14 percent wheat gluten; however, soft flours can also be used in the products of the present invention. Coarsely ground hard wheat flour, commonly known as semolina, has been found to impart additional strength to the disclosed paste products.

The amount of corn, soy and wheat flours present in the composition of the invention, based on the total weight of the three flours, is as follows: the corn in the composition should be present in an amount of about 45-85 percent, more particularly 45-75 percent, and preferably about 55-75 percent; the soy should be present in an amount of about 15-40 percent, more particularly 15-35 percent, and preferably about 20-30 percent; and the wheat flour can be present in an amount of about 0-30 percent and it has been found that products containing 5-25 percent, preferably about 8-12 percent of a hard wheat flour have the best appearance and workability. When these amounts are used, products can be obtained which have a protein content of as high as about 20-30 percent. A typical paste product having a protein content of about 20 percent can contain about 65 percent corn flour, 25 percent soy flour and 10 percent wheat flour.

Other materials can be added to the composition if so desired. For instance, if it is desired to make egg noodles, dry eggs or dry egg yolks can be blended with the flours prior to adding water. If it is desired to increase the nutritional value of the food, high protein substances such as milk proteins, fish protein concentrate, wheat germ flour or cottonseed flour may be substituted for part of the soy flour. Vitamins, minerals and other enriching agents such as thiamine, calcium and amino acids can also be added to the blend if desired.

In a preferred embodiment of the invention corn, soy and wheat flours and other desired ingredients are dry blended together until they are uniformly dispersed. Water is then added to the dry blend with continued mixing until a dough is obtained which is plastic enough to be extruded, but firm enough to cohere. In general, it has been found that the best results are obtained when the dough is sheeted or extruded through a die such as a macaroni die, spaghetti die, etc., and the sheeted or extruded shapes are cut to the desired size. The total moisture of the composition being extruded is about 25-50 percent on a weight basis, the preferred moisture content of the composition to be extruded being about 35-42 percent by weight. After extrusion, the material is dried under conditions such that the starch in the shaped good is gelatinized to the desired degree. Any of the common drying methods employing temperatures of about 150°-300° F. for periods of about 5-120 minutes can be used. Examples of typical drying equipment which have been found to be satisfactory are forced air tray driers or forced air continuous belt driers. These methods provide high enough temperatures to quickly dry the paste products and yet do not affect the shape of the extruded paste pieces. The paste products are dried to a final moisture content of about 5-12 percent by weight and, after cooling, are ready for packaging.

In a modification of the invention, partial gelatinization of the starch in the composition is effected at some point during the preparation of the product, but prior to the drying step. This can be accomplished either prior to extrusion, during extrusion, or after extrusion.

In another embodiment ungelatinized corn, soy and wheat flours and other desired ingredients are dry blended together until they are uniformly dispersed. Water is then added to the dry blend with continued mixing until a dough is obtained which is plastic enough to be extruded, but firm enough to cohere. In general, it has been found that the best results are obtained when the dough is sheeted or extruded through a die such as a macaroni die, spaghetti die, etc., and the sheeted or extruded shapes are cut to the desired size. The total moisture of the composition being extruded is about 25-50 percent on a weight basis, the preferred moisture content of the composition to be extruded being about 35-42 percent by weight. After extrusion, the material is dried under controlled temperatures and humidity conditions such that the starch therein is substantially ungelatinized. Any common paste drying methods employing temperatures up to 150° F. for periods of 12-48 hours can be used, provided there is humidity control. For example, room temperature air drying under a damp cloth, as well as forced air continuous or room paste driers may be employed. The product of this invention prepared with controlled air temperature and humidity differ from the high temperature products of this invention in that they have a less mottled appearance, are denser and require longer water cooking. They tend to have better shelf stability, being more resistant to breakage. The longer water cook time of these products can be compensated for by reducing their wall thickness by employing extruder dies with smaller openings.

The term "partially gelatinized" as used in the present discussion defines a degree of treatment of a starch bearing material in which at least about 10 percent of the starch in the material has been gelatinized to the extent that the starch granules are substantially fully hydrated and swollen, preferably without the occurrence of a large degree of granule rupturing. When at least about 10 percent of the starch granules are gelatinized the composition will remain firmly bound together during the processing and subsequent cooking of the product prior to serving. Although all of the starch in the composition can be gelatinized, it has been found that the best results are obtained when the degree of gelatinization is limited to about 10-75 percent of the starch in the composition. When the degree of gelatinization is within this preferred range, the finished product has a very pleasing appearance and there is no tendency of the shaped pieces to stick together during the drying operation, which latter result would reduce the drying rate of the product due to the formation therein of a tight, somewhat moisture impervious texture. Such is the case when the starch in the composition is fully gelatinized or when a large percentage of starch granules are ruptured in which instances a somewhat inferior, although acceptable, product is obtained. Furthermore, if an excessive amount of the starch granules are ruptured the product tends to crumble during processing and subsequent cooking.

The methods used to control the degree of gelatinization are well known and do not form any part of the present invention. Examples of methods which may be used are carefully regulating the amount of water added to the paste composition or the processing temperatures used, or adding gelatinization control agents to the formulation. If it is desired to process the paste composition without further gelatinization of the starch in the starting material a blend of pregelatinized and raw corn flours can be used, the relative amounts of each to be used being determined by the degree of gelatinization desired in the product. For example, if it were desired to process a material having about 50 percent of the starch in the corn flour gelatinized, a mixture containing half ungelatinized corn flour and half gelatinized corn flour would be used. If the partial gelatinization is to be effected prior to extrusion, the flours can be mixed and cooked in standard equipment, such as rotary batch cookers or continuous cookers until the desired degree of gelatinization is obtained. The dough is then kneaded and extruded as described above and then dried under carefully controlled conditions to prevent overgelatinization. Typically, the products prepared according to this embodiment will be dried at a temperature of about 90–150° F. in standard drying equipment until a final moisture content of less than 12 percent by weight is obtained. Alternatively, the gelatinization can be effected during the extrusion step, in which case the heating is accomplished by jacketed heating equipment, such as steam or electric heating coils which surround the barrel of the extruder. To supplement the heat from the jacketed heater live steam can be sparged directly into the dough during extrusion. When the partial gelatinization is to be accomplished subsequently to extrusion, it can be accomplished by autoclaving or by any other suitable means such as by immersing the shaped forms in hot water by means of a screened basket and heated until the desired degree of gelatinization is reached, whereupon the partially gelatinized forms are quickly removed from the heated water and rapidly cooled or quenched as by immersing them or spraying them with cold water to arrest cooking. This serves to remove surface starch which would tend to cause he pieces to stick together.

In another embodiment of the invention partially pregelatinized corn flour is substituted for some or all of the ungelatinized corn flour used in the formulation. When partially pregelatinized corn flour is used or when one of the above "pre-drier" gelatinization procedures is employed, care should be taken to insure that the drying operation does not cause the over-gelatinization of the starch in the flour. As noted above, this can be avoided by maintaining the temperature in the drying operation below that at which further gelatinization takes place. In other words, the drying temperature should be maintained below about 150° F. until the product is dried to the desired degree. As a further modification of the invention, the partial gelatinization can be effected in two or more of the processing steps. For example, some gelatinization of the starch in the composition can be effected during extrusion and the drying step can be used to further gelatinize the starch until the desired degree is reached. In like manner, partially pregelatinized corn flour can be used in the formulation and if further gelatinization is desired, it can be accomplished during the processing. Similarly, other combinations of process steps can be used to effect the partial gelatinization of the starch in the composition.

Another embodiment of this invention, when a substantially ungelatinized product is desired, is accomplished by processing without excessive heat. The dry blend of ingredients is mixed with water and formed by sheeting or extrusion using conventional paste techniques. No heat is added during extrusion, except that due to mechanical working within the extruder. The product is then conveyed and dried under controlled temperature and humidity conditions. Temperature is maintained at from room temperature, say about 70° F., to 150° F., and preferably from 50°–120° F. (dry bulb), and the air humidity is controlled to give a dry product after 8–48 hours' drying, more preferably 12–24 hours. Humidity control is maintained in continuous or room driers by injection of steam or by evaporation of water into the drying air with drying normally completed within 8–24 hours. Alternatively, the product may be covered with a moist material when long drying periods of 24–48 hours at room temperature can be tolerated.

As a further embodiment of this invention, we have found that hydrophilic colloids, particularly sodium alginate, in concentrations from 0.01–1.5 percent, and preferably 0.05–0.5 percent, significantly improve cooking tolerance and produce a more homogeneous appearing product. Cooking tolerance refers to the time a firm cooked pasta may be overcooked without the product breaking into small pieces or otherwise rendered organoleptically unacceptable. Generally, about 15 minutes or more is desirable.

We have further found that while the soy flour described herein produces a very acceptable product, that further improvements in firmness of the product or in cooking tolerance are produced by employing defatted soy flour with a Soluble Protein Index (NSI) of greater than 50.

We have further found that in extruding the products of this invention the dough temperature leaving the extruder is preferably maintained at less than 100° F. The control of reworking and kneading of the dough during extrusion to prevent excessive temperature and working appears to improve the firmness of the cooked product.

The following examples will serve to illustrate specific embodiments of the invention.

EXAMPLE I

A blend of 60 percent corn flour, 30 percent defatted soy flour and 10 percent semolina was mixed in a Hobart mixer with about 40 percent by weight of water based on the total dry weight of the flour blend and mixed into a loose, free flowing mixture. The dough was then extruded through a common elbow macaroni die using a Bonnot extruder. The elbow shapes were cut at the die face into goods one-half to 2 inches in length. The shapes were then dried for 12 minutes at 220° F. After drying, the product was cooled to room temperature and packaged, the packaged product moisture being about 8 percent. The product had a light yellow color and opaque appearance, and its surface was free from cracks. When a portion of this product was cooked in boiling water for about 6 minutes, a delicious and firm textured macaroni was obtained.

EXAMPLE II

A flour blend as described in Example I was mixed with a sufficient quantity of water to produce a paste containing about 35 percent moisture which was cooked for about 8 minutes at 15 p.s.i.g. The cooked paste was cooled to room temperature and extruded through a common elbow macaroni die using a Welding Engineers extruder. The elbow shapes were cut off at the die face into pieces one-half to 2 inches in length. The shapes were then dried for about 12 minutes at 220° F. to a finished product moisture of about 8 percent. The product obtained was slightly darker than the product of Example I and its surface showed no visible checking. When cooked in water for 6 minutes, a chewy, pleasant tasting macaroni product was obtained.

EXAMPLE III

A blend of 69 percent corn flour, 30 percent defatted soy flour and 1 percent calcium carbonate was mixed with water to produce a paste of about 35 percent moisture. The paste was cooked for about 10 minutes at 15 p.s.i.g., cooled to room temperature, extruded and cut into elbow shapes about one-half to 2 inches in length using a Welding Engineers extruder. The shapes were dried at 130° F. for 60 minutes yielding a smooth, golden colored product which, when cooked in boiling water for 6 minutes, produced a firm, delicious macaroni.

EXAMPLE IV

A dry blend was made containing 69 percent corn flour, 30 percent defatted soy flour and 1 percent calcium carbonate. This blend was mixed with water, extruded and dried according to the procedure of Example I. The dried product had a light color and a smooth surface, free from cracks. When cooked in boiling water for 6 minutes, the resulting product had a firm texture and a pleasing taste.

EXAMPLE V

A. A dry blend was made containing 49 percent ungelatinized corn flour, 30 percent defatted soy flour (soya fluff by Central Soya), 20 percent durham wheat and 1 percent food grade calcium carbonate. The blend, weighing 700 pounds, was mixed in a ribbon blender until a uniform mix was obtained. The dry blend was loaded into a hopper for continuous feed to a conventional paste extruder.

To a separate tank was added 434 pounds of water, the tank being piped directly to the feed trough of the extruder.

To the extruder was fed continuously 17.9 pounds per minute of the dry blend and 7½ pounds per minute of water. The extruder was a deMarco paste extruder fitted with a standard elbow macaroni die. The dry blend and water were mixed in the extruder blending section and extruded through the die to produce elbows having a 35/1,000 inch wall thickness.

The extruded elbows were conveyed to a continuous, multipass belt drier. The drier was operated at 108° F. dry bulb temperature and 98° F. wet bulb temperature. The retention time in the drier was 12 hours, the product issuing therefrom being substantially ungelatinized has about a 7 percent moisture content. The product was golden yellow, similar in color to egg noodles. The dry product, cooked 6-8 minutes in boiling water, produces an edible food. Cooking 12-15 minutes is normally sufficient to produce a macaroni having a texture similar to that of conventional macaroni products. Cooking times up to 25 minutes can be tolerated without destroying the firm texture of the high protein elbows.

B. A second run was made, except that the 20 percent durham wheat was replaced with 10 percent semolina wheat flour, and the 49 percent ungelatinized corn flour was increased to 59 percent by weight of the batch. Extrusion and drying produced elbows similar in color and cooked texture to those above.

C. A third batch was prepared, but only 59 percent ungelatinized corn flour, 30 percent soy and 1 percent calcium carbonate was dry blended. Durham wheat was slurried in the water and the dry mix and wheat slurry metered to the extruder to give 10 percent wheat in the final extruded elbows. The slurry rate was 7.6 pounds per minute and the dry mix rate was 12.5 pounds per minute. The use of a water slurry allowed a smaller percentage of wheat flour to be employed while maintaining the firm texture of the subsequently water cooked product. It has been found that the wheat content can be reduced by at least 50 percent by use of the slurry technique.

When high protein elbow macaroni is prepared as in Example V (A) and the extruded product placed on screens at room temperature and covered by damp cloths and maintained in this condition for 24-48 hours, a dry, shelf-stable product is produced which, when water cooked, has a good macaronilike texture.

We claim:

1. A process for preparing alimentary paste products of improved nutritional value and characterized by having improved firmness and improved cooking tolerances containing combinations of corn and soy flours as major replacements for the wheat flour normally present in alimentary formulations comprising the steps of:
   a. mixing about 45-85 percent corn flour, about 15-40 percent soy flour, having a soluble protein index (NSI) of greater than 50 and about 0-30 percent wheat flour, said percentages being based on the total combined weight of the flours, with water to form a dough having about 35-42 percent moisture on a weight basis;
   b. forming the dough into pieces having the desired shape of the product; and
   c. drying the shaped dough pieces to a final moisture content of 5-12 percent by weight of the product.

2. A process according to claim 1 wherein said composition contains 45-75 percent corn flour, 15-35 percent soy flour, and 5-25 percent wheat flour.

3. A process according to claim 1 wherein said composition contains at least 55 percent corn flour, 20-30 percent soy flour, and 8-12 percent wheat flour.

4. A process according to claim 1 wherein forming the dough takes place in an extruder.

5. A process according to claim 4 wherein the dough temperature leaving the extruder is maintained at less than 100° F.

6. A process according to claim 1 wherein the wheat flour is slurried with water and the slurry is added to the other flours at up to 30 percent wheat flour by weight of the total combined weight of the flours.

7. A process according to claim 1 wherein the composition further contains minor amounts of food nutrients.

8. A process according to claim 7 wherein the composition contains vitamins and minerals.

9. A process according to claim 1 in which the corn flour is substantially ungelatinized.

10. A process according to claim 9 in which the dough pieces are air dried by conventional paste drying at controlled temperature and humidity in up to 48 hours.

11. A process according to claim 10 in which the dough is subdivided by an extruder and in which the dough temperature leaving the extruder is maintained at less than 100° F.

12. A process according to claim 9 in which the shaped dough pieces are air dried at an air temperature of about 150°-300° F. while simultaneously at least partially gelatinizing the starch contained in the dough to the extent that at least about 10 percent of the starch in the material has been gelatinized to the extent that the starch granules are substantially fully hydrated and swollen without the occurrence of a large degree of granule rupturing.

13. A dry alimentary paste product of improved nutritional value and characterized by having improved firmness and improved cooking tolerance containing combinations of corn and soy flours as major replacements for the wheat flour normally present in alimentary formulations comprising about 45-85 percent corn flour, about 15-40 percent soy flour having a soluble protein index (NSI) of greater than 50 and about 0-30 percent wheat flour, said percentages being based on the total combined weight of the flours.

14. The product of claim 13 in which the paste product comprises 55-75 percent corn flour, 20-30 percent soy flour, and 5-25 percent wheat flour.

15. The product of claim 13 in which the paste product contains at least 55 percent substantially ungelatinized corn flour, 20-30 percent soy flour, 8-12 percent wheat flour and vitamins and minerals.

* * * * *